April 23, 1957     G. H. MULLER ET AL     2,789,830
TORSION BAR INDEPENDENT REAR WHEEL SUSPENSION WITH
MEANS TO LIMIT THE WHEEL DEFLECTION
Filed Feb. 9, 1954
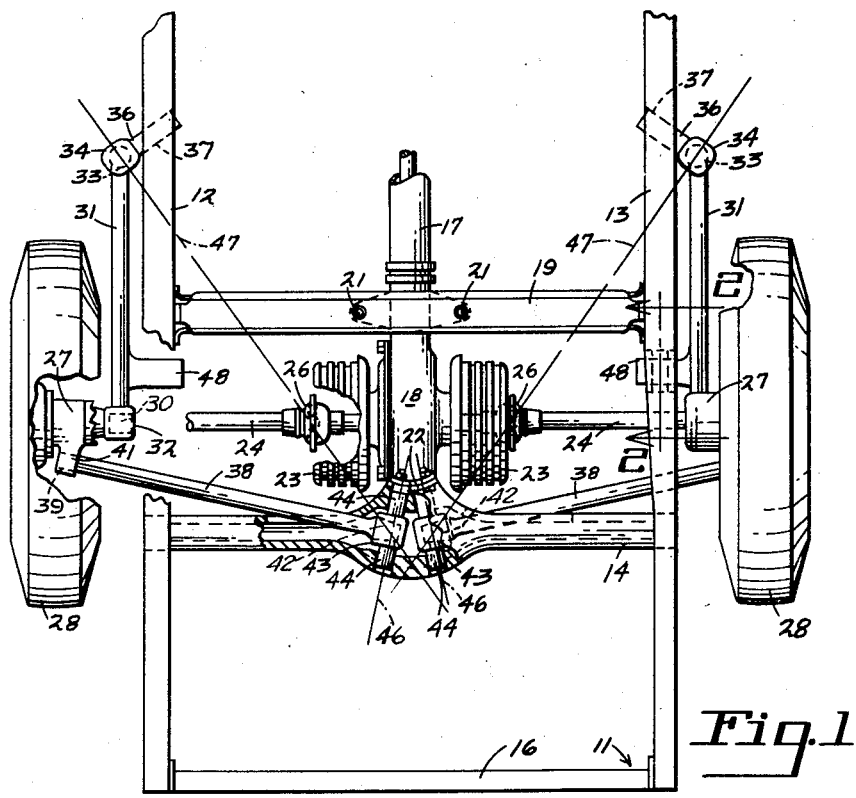
Fig.1
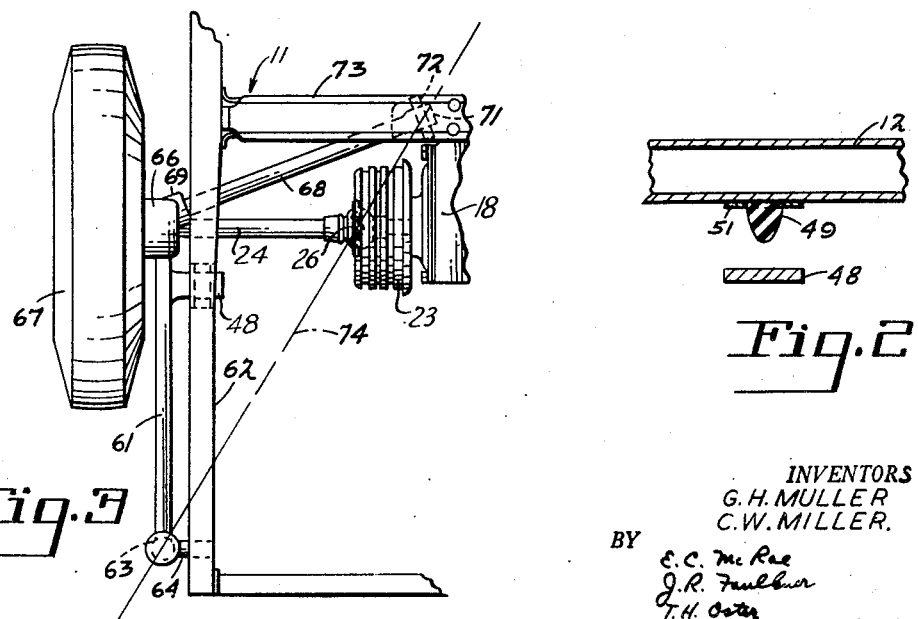
Fig.3
Fig.2
INVENTORS
G. H. MULLER
C. W. MILLER.
BY
E. C. McRae
J. R. Faulkner
T. H. Oster
ATTORNEYS United States Patent Office 2,789,830
Patented Apr. 23, 1957

2,789,830

TORSION BAR INDEPENDENT REAR WHEEL SUSPENSION WITH MEANS TO LIMIT THE WHEEL DEFLECTION

George H. Muller, Northville, and Clarence W. Miller, Detroit, Mich., assignors to Ford Motor Company, Dearborn, Mich., a corporation of Delaware Application February 9, 1954, Serial No. 409,110

1 Claim. (Cl. 280—124)

This invention relates generally to motor vehicles, and has particular reference to an independent rear wheel suspension for a motor vehicle.

It is an object of the present invention to provide a motor vehicle wheel suspension in which a torsion bar and a control arm cooperate to guide the rising and falling movements of the vehicle wheel and to take the various loads to which the wheel is subjected, as well as to form the spring suspension therefor. In an embodiment of the invention this is accomplished by providing a longitudinally extending control arm universally connected at its forward end to the vehicle frame and rigidly connected at its rearward end to the wheel supporting member, and by providing for cooperation therewith a generally transversely extending torsion bar rigidly connected at its outer end to the wheel supporting member and pivotally connected at its inner end to the vehicle frame for pivotal movement about an axis extending at an angle to the torsion bar and also at an angle to the axis connecting the ends of the control arm and torsion bar to the vehicle frame. The control arm and torsion bar cooperate to guide the wheel in its rising and falling movements, and the arrangement is such that the torsion bar is torsionally stressed as the wheel rises and falls so as to form the spring suspension for the wheel.

The suspension system of this invention is particularly suitable for use in connection with driven wheels such as the rear wheels of a conventional automotive vehicle. The differential and driving gear housing may be mounted directly upon the vehicle frame with power being transmitted to the rear wheels through axle shafts provided with universal joints. The geometry of the construction may be such that the pivotal connection between the inner end of the torsion bar and the frame is in alignment with the universal connection between the axle shaft and the differential unit and also with the universal connection between the forward end of the control arm and the frame. A triangulated system is thus formed, arranged for oscillation about a diagonally extending axis formed by these aligned connections.

With the control arm extending longitudinally of the vehicle along the vehicle frame, it forms a swinging arm compelling travel of the rear wheel in a definite path, and is effective to control the movement of the rear wheel even in the event of failure or breakage of the torsion bar, so as to permit the vehicle to be safely brought to a standstill. The control arm is provided with a portion enagageable with a suspension bumper mounted upon the vehicle frame so as to provide a resilient stop limiting downward movement of the frame and chassis.

Other objects and advantages of this invention will be made more apparent as this description proceeds, particularly when considered in connection with the accompanying drawings, wherein:

Figure 1 is a plan view of the rearward portion of a motor vehicle chassis embodying the present invention.

Figure 2 is a cross sectional view taken on the plane indicated by the line 2—2 of Figure 1.

Figure 3 is a plan view of the rearward portion of a motor vehicle chassis illustrating a modification of the invention.

This invention constitutes a modification of the co-pending application of E. S. MacPherson, Serial 362,510 and since issued as Patent No. 2,757,747, for Independent Wheel Suspension For Motor Vehicles.

Referring now to the drawings, and particularly to Figure 1, the reference character 11 indicates generally the frame of a motor vehicle having side frame rails 12 and 13 joined at their rearward ends by a pair of cross frame members 14 and 16. Power from the vehicle engine (not shown) is transmitted through a torque tube 17 to conventional differential and drive gearing contained within a housing 18. The housing 18 is resiliently supported upon a cross frame member 19 by means of resilient mounts 21. In addition, the rearward end of the differential housing 18 is secured to a vertically extending flange 22 of the cross frame member 14.

The differential housing 18 supports conventional brake units 23 on opposite sides thereof. A pair of driven axle shafts 24 are connected by universal joints 26 to the differential and drive gear assembly, and extend outwardly to wheel hubs 27 for the rear wheels 28.

Extending longitudinally of the vehicle adjacent the outboard side of each side frame rail 12 is a control arm 31. A splined connection 30 is provided between the rearward end of the control arm 31 and the downwardly projecting extension 32 of the wheel hub 27. The forward end of the control arm 31 is formed with a ball 33 received within a socket 34 carried at the outer end of a supporting member 36. The shank 37 of the supporting member 36 is supported by the box section side frame rail.

Cooperating with the control arm 31 in forming a suspension for each rear road wheel 28 is a torsion bar 38. The outer end of the torsion bar 38 is nonrotatably received within a bore 39 formed in an integral rearwardly extending projection 41 of the wheel hub 27. The torsion bar 38 extends generally transversely inwardly from this outer connection, being inclined slightly in a rearward direction. A splined connection 42 is provided between the inner end of the torsion bar 38 and the supporting member 43. The supporting member 43 has oppositely extending trunnions 44 journaled in the cross frame member 14 for rotation about an inclined axis indicated by the reference character 46. This axis is horizontal and extends at right angles to the axis of the torsion bar 38. In addition, it extends at an angle of approximately 45 degrees to the axis 47 interconnecting the universal connection 33—34 between the forward end of the control arm 31 and the vehicle frame and the connection 42—43 between the inward end of the torsion bar 38 and the cross frame member 14.

The control arm 31 and torsion bar 38 form a triangulated suspension guiding the rising and falling movement of the rear wheel 28 in a path about the inclined axis 47. The ball joint connection at the forward end of the control arm 31 accommodates movement about this axis, but since the inward end of the torsion bar 38 is mounted for pivotal movement about the inclined axis 46 it will be seen that the rising and falling movements of the road wheel result in torsionally stressing the torsion bar 38. Consequently the torsion bar 38 serves as a spring to resiliently and independently suspend the rear wheel, and in addition cooperates with the control arm in guiding the wheel in a predetermined path. The angle of the axis 46 need not necessarily be at right angles to the axis of the torsion bar 38, but may be arranged at different angles thereto to vary the torsional stress to which the bar is subjected during the rising and falling movements of the vehicle wheel.

The universal joint 26 between the axle shaft 24 and the differential unit 18 lies on the axis 47 so that the movement of the axle 24 is coordinated with the movement of the torsion bar and control arm.

The control arm 31 serves as a trailing arm to require movement of the wheel hub 27 and the road wheel 28 in an arc about the center of the ball joint connection 33—34. Consequently, the control arm serves to control the movement of the road wheel even in the event of breakage or other failure of the torsion bar 38, so as to prevent an accident and enable the car to be brought to a halt. Contributing to this safety feature is a laterally inwardly projecting arm 48 carried by the rearward portion of the control arm 31. The projecting arm 48 extends beneath the adjacent side frame rail and, as best seen in Figure 2, is located directly beneath a rubber suspension bumper 49 carried by a plate 51 secured to the underside of the side frame rail. During normal operation the projecting arm 48 of the control arm 31 does not strike the resilient bumper 49, but in the event of extreme wheel movement relative to the frame, the arm 48 will engage the resilient bumper.

Reference is now made to Figure 3 which illustrates a modification of the invention. This modification is generally a reversal of the construction shown in Figure 1. The control arm 61 extends longitudinally of the side frame rail 62 and is connected by means of a ball joint connection 63 at its rearward end to a supporting member 64 carried by the frame rail. At its forward end the control arm 61 is nonrotatably connected to a wheel supporting hub 66 carrying the road wheel 67. The torsion bar 68 extends transversely inwardly from the wheel hub 66, being inclined slightly forwardly therefrom. The outer end of the torsion bar 68 is nonrotatably connected to an extension 69 of the wheel hub and the inner end 71 of the torsion bar is mounted for rotation about an inclined axis 72 on the frame cross member 73. Rising and falling movement of the road wheel results in swinging movement of the control arm 61 and torsion bar 68 about the inclined axis 74. Since the axis 72 at the inner end of the torsion bar 68 is inclined with respect to the axis 74 rising and falling movement of the wheel results in torsionally stressing the bar.

It will be understood that the invention is not to be limited to the exact construction shown and described, but that various changes and modifications may be made without departing from the spirit and scope of the invention, as defined in the appended claim.

What is claimed is:

In a suspension system for a motor vehicle having a pair of generally parallel longitudinally extending side frame rails interconnected adjacent their rearward ends by a transversely extending cross frame member, a supporting member adjacent a side frame rail and having means thereon to rotatably mount a wheel, a longitudinally extending control arm adjacent the outboard side of said last mentioned side frame rail and nonrotatably connected at its rearward end to said wheel supporting member, a ball joint connection between the forward end of said control arm and said last mentioned side frame rail, said control arm having a part adjacent the rearward end thereof projecting beneath the adjacent side frame rail, a resilient bumper between said projecting part and said side frame rail to limit downward movement of said frame rail, a torsion bar having its outer end nonrotatably connected to said wheel supporting member and extending inwardly therefrom and being inclined rearwardly, a torsion bar end support nonrotatably connected to the inner end of said torsion bar, and means rotatably mounting said torsion bar end support upon said cross frame member adjacent the longitudinal center line of said frame for rotation about an axis extending generally longitudinally of the vehicle and at an angle to the axis joining said torsion bar end support and the ball joint connection at the forward end of said control arm.

References Cited in the file of this patent
UNITED STATES PATENTS

| | | |
|---|---|---|
| 2,133,633 | Rabe et al. | Oct. 18, 1938 |
| 2,164,838 | Porsche | July 4, 1939 |
| 2,256,069 | Wagner | Sept. 16, 1941 |